(12) United States Patent
Padullaparthi et al.

(10) Patent No.: US 11,251,749 B2
(45) Date of Patent: Feb. 15, 2022

(54) METHODS AND SYSTEMS FOR FAULT DETECTION, DIAGNOSIS AND LOCALIZATION IN SOLAR PANEL NETWORK

(71) Applicant: Tata Consultancy Services Limited, Mumbai (IN)

(72) Inventors: Venkata Ramakrishna Padullaparthi, Hyderabad (IN); Sneha Mary Thumma, Hyderabad (IN); Arunchandar Vasan, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 17/073,010

(22) Filed: Oct. 16, 2020

(65) Prior Publication Data

US 2021/0119576 A1     Apr. 22, 2021

(30) Foreign Application Priority Data

Oct. 16, 2019   (IN) .............................. 201921041963

(51) Int. Cl.
*H02S 50/10*     (2014.01)
*G06F 30/27*     (2020.01)
*G06F 111/10*    (2020.01)

(52) U.S. Cl.
CPC .............. *H02S 50/10* (2014.12); *G06F 30/27* (2020.01); *G06F 2111/10* (2020.01)

(58) Field of Classification Search
CPC ........ H02S 50/10; G06F 30/27; G06F 2111/10
See application file for complete search history.

(56) References Cited

U.S. PATENT DOCUMENTS 9,806,523 B2 * 10/2017 Stratakos .............. H03K 17/102
10,389,300 B2 * 8/2019 Ko .......................... H02S 40/34
(Continued)

FOREIGN PATENT DOCUMENTS

CN      104753461 B      4/2017
CN      106961249 B      2/2019
(Continued)

OTHER PUBLICATIONS

Alajmi et al, Fault Detection and Localization in Solar Photovoltaic Arrays Using the Current-Voltage Sensing Framework, 2016.*

*Primary Examiner* — Alexander Satanovsky
*Assistant Examiner* — Lynda Dinh
(74) *Attorney, Agent, or Firm* — Finnegan, Henderson, Farabow, Garrett & Dunner, LLP

(57) ABSTRACT

Various fault types occurring at multiple possible locations in the solar panel network are simulated using the network simulation model. The dataset covering multiple fault scenarios and multiple no-fault scenarios is determined for training the CNN model. The fault scenarios include one fault type alone at particular location or multiple locations, as well as multiple fault types at multiple locations. The fault types include a short circuit fault, an open circuit fault, a shading fault, a soiling fault, a hot-spot fault, an arc fault, a degradation fault, and a clipping fault, the short circuit fault comprises a line-line fault, and a line-ground fault The convolutional neural network (CNN) model is trained with fault datasets and no-fault datasets covering various fault sensors and no-fault scenarios to generate the FDDL model. The fault datasets and no-fault datasets are determined based on the network simulation model of the solar panel network.

19 Claims, 6 Drawing Sheets

(56) References Cited

U.S. PATENT DOCUMENTS

2012/0286961 A1\* 11/2012 Komano ................. H02S 50/10
340/653
2018/0373824 A1 12/2018 Meagher et al.
2019/0149089 A1\* 5/2019 Xu .......................... H02S 50/10
324/761.01

FOREIGN PATENT DOCUMENTS

| CN | 110224673 | A | | 9/2019 |
| CN | 110224673 | A | \* | 10/2020 |

\* cited by examiner

METHODS AND SYSTEMS FOR FAULT DETECTION, DIAGNOSIS AND LOCALIZATION IN SOLAR PANEL NETWORK

PRIORITY CLAIM

This U.S. patent application claims priority under 35 U.S.C. § 119 to: Indian Patent Application No. 201921041963, filed on 16 Oct. 2019. The entire contents of the aforementioned application are incorporated herein by reference.

TECHNICAL FIELD

The disclosure herein generally relates to the field of testing and monitoring of solar panel networks, and, more particularly, to methods and systems for fault detection, diagnosis and localization in a solar panel network.

BACKGROUND

Solar photovoltaic (PV) segment is growing very rapidly owing to decline in capital costs including technology costs and manufacturing costs. While capital costs are declining, maintenance and operational costs still prohibit solar panel networks or solar plants from achieving optimum profitability. It is estimated that about 19% of the annual energy in the solar panel networks may be lost due to faults occurring in the solar panel networks, from studies conducted for domestic solar generation in United Kingdom. Although many types of faults exist, some of the faults such as a line-line fault, a line-ground fault, an arc fault and a hot spot fault are especially critical, as they not only cause hefty energy loss, but are also hazardous that may cause severe damage to the solar panel networks. Conventional fault detection and diagnosis (FDD) techniques for the solar panel networks are limited and confined to identifying faults either at broader classification level (voltage level or current level) or to studying one specific fault type at a time.

SUMMARY

Embodiments of the present disclosure present technological improvements as solutions to one or more of the above-mentioned technical problems recognized by the inventors in conventional systems. For example, in one aspect, a processor-implemented method for fault detection, diagnosis and localization in a solar panel network under test is provided. The method comprising the steps of: obtaining a schema of the solar panel network under test, using a schema algorithm, wherein the solar panel network under test comprises a plurality of solar panels and a plurality of circuit elements, the plurality of solar panels arranged in one or more strings, one or more sub-arrays and one or more arrays, along with one or more circuit elements of the plurality of circuit elements and one or more inverters; determining a set of solar panel parameters for each solar panel present in the solar panel network under test, based on a name-plate dataset of each solar panel and a time-stamped operational log dataset of the solar panel network under test, wherein the set of solar panel parameters for each solar panel comprises a photo (light) current ($I_L$), a diode reverse saturation current ($I_O$), a series resistance ($R_S$), a shunt resistance ($R_{SH}$), and an ideality factor (n); generating a network simulation model for the solar panel network under test, from the obtained schema and the set of solar panel parameters for each solar panel, using a modelling technique; randomly generating a plurality of fault feature tensors (FFTs) and a plurality of no-fault feature tensors (NFFTs), for the generated network simulation model, wherein each fault feature tensor (FFT) of the plurality of fault feature tensors (FFTs) is associated with a fault scenario of a plurality of fault scenarios and each no-fault feature tensor (NFFT) of the plurality of no-fault feature tensors (NFFTs) is associated with a no-fault scenario of a plurality of no-fault scenarios, wherein each fault scenario is defined based on one or more fault types occurring at one or more fault locations in the solar panel network under test, and one or more environmental parameters comprising an operating temperature of an environment and a solar irradiance value of the environment, and each no-fault scenario is defined based on the one or more environmental parameters comprising the operating temperature of the environment and the solar irradiance value of the environment; determining (i) a no-fault simulated dataset for each no-fault feature tensor (NFFT) of the plurality of no-fault feature tensors (NFFTs) by simulating the corresponding no-fault feature tensor (NFFT) using the generated network simulation model, and (ii) a fault simulated dataset for each fault feature tensor (FFT) of the plurality of fault feature tensors (FFTs) by simulating the corresponding fault feature tensor (FFT), using the generated network simulation model; randomly dividing the plurality of fault feature tensors (FFTs) and the plurality of no-fault feature tensors (NFFTs) into a training dataset and a testing dataset, based on a predefined ratio, wherein the training dataset comprises one or more training FFTs along with corresponding fault simulated datasets and one or more training NFFTs along with corresponding no-fault simulated datasets, and the testing dataset comprises one or more testing FFTs along with corresponding fault simulated datasets and one or more testing NFFTs along with corresponding no-fault simulated datasets; and generating, via the one or more hardware processors, a fault detection, diagnosis and localization (FDDL) model for fault detection, diagnosis and localization in the solar panel network under test, by training a convolutional neural network (CNN) model with the training dataset, wherein (i) each training FFT of the one or more training FFTs present in the training dataset, is provided as label and the corresponding fault simulated dataset is provided as an input to the CNN model, and (ii) each training NFFT of the one or more training NFFTs present in the training dataset, is provided as label and the corresponding no-fault simulated dataset is provided as the input to the CNN model.

In another aspect, a system for fault detection, diagnosis and localization in a solar panel network under test is provided. The system comprising: a memory storing instructions; one or more Input/Output (I/O) interfaces; and one or more hardware processors coupled to the memory via the one or more I/O interfaces, wherein the one or more hardware processors are configured by the instructions to: obtain a schema of the solar panel network under test, using a schema algorithm, wherein the solar panel network under test comprises a plurality of solar panels and a plurality of circuit elements, the plurality of solar panels arranged in one or more strings, one or more sub-arrays and one or more arrays, along with one or more circuit elements of the plurality of circuit elements and one or more inverters; determine a set of solar panel parameters for each solar panel present in the solar panel network under test, based on a name-plate dataset of each solar panel and a time-stamped operational log dataset of the solar panel network under test, wherein the set of solar panel parameters for each solar panel comprises a photo (light) current ($I_L$), a diode reverse saturation current ($I_O$), a series resistance ($R_S$), a shunt resistance ($R_{SH}$), and an ideality factor (n); generate a network simulation model for the solar panel network under test, from the obtained schema and the set of solar panel parameters for each solar panel, using a modelling technique; randomly generate a plurality of fault feature tensors (FFTs) and a plurality of no-fault feature tensors (NFFTs), for the generated network simulation model, wherein each fault feature tensor (FFT) of the plurality of fault feature tensors (FFTs) is associated with a fault scenario of a plurality of fault scenarios and each no-fault feature tensor (NFFT) of the plurality of no-fault feature tensors (NFFTs) is associated with a no-fault scenario of a plurality of no-fault scenarios, wherein each fault scenario is defined based on one or more fault types occurring at one or more fault locations in the solar panel network under test, and one or more environmental parameters comprising an operating temperature of an environment and a solar irradiance value of the environment, and each no-fault scenario is defined based on the one or more environmental parameters comprising the operating temperature of the environment and the solar irradiance value of the environment; determine (i) a no-fault simulated dataset for each no-fault feature tensor (NFFT) of the plurality of no-fault feature tensors (NFFTs) by simulating the corresponding no-fault feature tensor (NFFT) using the generated network simulation model, and (ii) a fault simulated dataset for each fault feature tensor (FFT) of the plurality of fault feature tensors (FFTs) by simulating the corresponding fault feature tensor (FFT), using the generated network simulation model; randomly divide the plurality of fault feature tensors (FFTs) and the plurality of no-fault feature tensors (NFFTs) into a training dataset and a testing dataset, based on a predefined ratio, wherein the training dataset comprises one or more training FFTs along with corresponding fault simulated datasets and one or more training NFFTs along with corresponding no-fault simulated datasets, and the testing dataset comprises one or more testing FFTs along with corresponding fault simulated datasets and one or more testing NFFTs along with corresponding no-fault simulated datasets; and generate a fault detection, diagnosis and localization (FDDL) model for fault detection, diagnosis and localization in the solar panel network under test, by training a convolutional neural network (CNN) model with the training dataset, wherein (i) each training FFT of the one or more training FFTs present in the training dataset, is provided as label and the corresponding fault simulated dataset is provided as an input to the CNN model, and (ii) each training NFFT of the one or more training NFFTs present in the training dataset, is provided as label and the corresponding no-fault simulated dataset is provided as the input to the CNN model.

In yet another aspect, there is provided a computer program product comprising a non-transitory computer readable medium having a computer readable program embodied therein, wherein the computer readable program, when executed on a computing device, causes the computing device to: obtain a schema of the solar panel network under test, using a schema algorithm, wherein the solar panel network under test comprises a plurality of solar panels and a plurality of circuit elements, the plurality of solar panels arranged in one or more strings, one or more sub-arrays and one or more arrays, along with one or more circuit elements of the plurality of circuit elements and one or more inverters; determine a set of solar panel parameters for each solar panel present in the solar panel network under test, based on a name-plate dataset of each solar panel and a time-stamped operational log dataset of the solar panel network under test, wherein the set of solar panel parameters for each solar panel comprises a photo (light) current ($I_L$), a diode reverse saturation current ($I_O$), a series resistance ($R_S$), a shunt resistance ($R_{SH}$), and an ideality factor (n); generate a network simulation model for the solar panel network under test, from the obtained schema and the set of solar panel parameters for each solar panel, using a modelling technique; randomly generate a plurality of fault feature tensors (FFTs) and a plurality of no-fault feature tensors (NFFTs), for the generated network simulation model, wherein each fault feature tensor (FFT) of the plurality of fault feature tensors (FFTs) is associated with a fault scenario of a plurality of fault scenarios and each no-fault feature tensor (NFFT) of the plurality of no-fault feature tensors (NFFTs) is associated with a no-fault scenario of a plurality of no-fault scenarios, wherein each fault scenario is defined based on one or more fault types occurring at one or more fault locations in the solar panel network under test, and one or more environmental parameters comprising an operating temperature of an environment and a solar irradiance value of the environment, and each no-fault scenario is defined based on the one or more environmental parameters comprising the operating temperature of the environment and the solar irradiance value of the environment; determine (i) a no-fault simulated dataset for each no-fault feature tensor (NFFT) of the plurality of no-fault feature tensors (NFFTs) by simulating the corresponding no-fault feature tensor (NFFT) using the generated network simulation model, and (ii) a fault simulated dataset for each fault feature tensor (FFT) of the plurality of fault feature tensors (FFTs) by simulating the corresponding fault feature tensor (FFT), using the generated network simulation model; randomly divide the plurality of fault feature tensors (FFTs) and the plurality of no-fault feature tensors (NFFTs) into a training dataset and a testing dataset, based on a predefined ratio, wherein the training dataset comprises one or more training FFTs along with corresponding fault simulated datasets and one or more training NFFTs along with corresponding no-fault simulated datasets, and the testing dataset comprises one or more testing FFTs along with corresponding fault simulated datasets and one or more testing NFFTs along with corresponding no-fault simulated datasets; and generate a fault detection, diagnosis and localization (FDDL) model for fault detection, diagnosis and localization in the solar panel network under test, by training a convolutional neural network (CNN) model with the training dataset, wherein (i) each training FFT of the one or more training FFTs present in the training dataset, is provided as label and the corresponding fault simulated dataset is provided as an input to the CNN model, and (ii) each training NFFT of the one or more training NFFTs present in the training dataset, is provided as label and the corresponding no-fault simulated dataset is provided as the input to the CNN model.

In an embodiment, the generated FDDL model is tested with the testing dataset, wherein (i) each testing FFT of the one or more testing FFTs present in the testing dataset, is provided as the label and the corresponding fault simulated dataset is provided as the input to the generated FDDL model, and each testing NFFT of the one or more testing NFFTs present in the testing dataset, is provided as the label and the corresponding no-fault simulated dataset is provided as the input to the CNN model.

In an embodiment, the CNN model comprises three 2-dimensional convolutional layers each connected with a max-pooling layer and a dropout layer, and two fully connected layers connected with the dropout layer.

In an embodiment, the name-plate dataset of each solar panel present in the solar panel network under test, comprises a number of PV cells ($N_S$) present in the corresponding solar panel, an open circuit voltage ($V_{OC\text{-}SRC}$), a short circuit current ($I_{SC\text{-}SRC}$), a maximum power point voltage ($V_{MP\text{-}SRC}$), and a maximum power point current ($I_{MP\text{-}SRC}$), at standard rating conditions, and the time-stamped operational log dataset of the solar panel network under test, comprises one or more of: a solar panel-wise current and a solar panel-wise voltage of each solar panel, a string-wise current and a string-wise voltage of each string, a sub-array-wise current and a sub-array-wise voltage of each sub-array, an array-wise current and an array-wise voltage of each array, a set of voltages of each inverter (DC and AC) of the one or more inverters, a power output of each inverter, a solar irradiation value (G), a cloudiness value (C), a rainfall value (r), a solar panel temperature of each solar panel, a temperature of each inverter, and a set of fault currents.

In an embodiment, the no-fault simulated dataset for each no-fault feature tensor (NFFT) is determined based on the set of solar panel parameters for each solar panel and the one or more environmental parameters, and comprises a solar panel level no-fault simulated Current-Voltage-Power dataset ($SC_p$, $SV_p$, $SP_p$) of each solar panel, a string level no-fault simulated Current-Voltage-Power dataset ($SC_s$, $SV_s$, $SP_s$) of each string, a sub-array level no-fault simulated Current-Voltage-Power dataset ($SC_{sa}$, $SV_{sa}$, $SP_{sa}$) of each sub-array, an array level no-fault simulated Current-Voltage-Power dataset ($SC_a$, $SV_a$, $SP_a$) of each array, and an inverter level no-fault simulated Current-Voltage-Power dataset ($SC_i$, $SV_i$, $SP_i$) of each inverter.

In an embodiment, the solar panel level no-fault simulated Current-Voltage-Power dataset ($SC_p$, $SV_p$, $SP_p$) of each solar panel is determined based on the set of parameters of the corresponding solar panel and the one or more environmental parameters, the string level no-fault simulated Current-Voltage-Power dataset ($SC_s$, $SV_s$, $SP_s$) of each string is determined based on the solar panel level Current-Voltage-Power dataset ($SC_p$, $SV_p$, $SP_p$) of each solar panel present in the corresponding string, the sub-array level no-fault simulated Current-Voltage-Power dataset ($SC_{sa}$, $SV_{sa}$, $SP_{sa}$) of each sub-array is determined based on the string level no-fault simulated Current-Voltage-Power dataset ($SC_s$, $SV_s$, $SP_s$) of each string present in the corresponding sub-array, the array level no-fault simulated Current-Voltage-Power dataset ($SC_a$, $SV_a$, $SP_a$) of each array is determined based on the sub-array level no-fault simulated Current-Voltage-Power dataset ($SC_{sa}$, $SV_{sa}$, $SP_{sa}$) of each sub-array present in the corresponding array, and the inverter level no-fault simulated Current-Voltage-Power dataset ($SC_i$, $SV_i$, $SP_i$) of each inverter is determined based on the corresponding array level no-fault simulated Current-Voltage-Power dataset ($SC_a$, $SV_a$, $SP_a$) and the one or more environmental parameters.

In an embodiment, the fault simulated dataset for each fault feature tensor (FFT) is determined based on the set of solar panel parameters for each solar panel and the one or more environmental parameters, and comprises a solar panel level fault simulated Current-Voltage-Power dataset ($FC_p$, $FV_p$, $FP_p$) of each solar panel, a string level fault simulated Current-Voltage-Power dataset ($FC_s$, $FV_s$, $FP_s$) of each string, a sub-array level fault simulated Current-Voltage-Power dataset ($FC_{sa}$, $FV_{sa}$, $FP_{sa}$) of each sub-array, an array level fault simulated Current-Voltage-Power dataset ($FC_a$, $FV_a$, $FP_a$) of each array, and an inverter level fault simulated Current-Voltage-Power dataset ($FC_i$, $FV_i$, $FP_i$) of each inverter.

In an embodiment, the solar panel level fault simulated Current-Voltage-Power dataset ($FC_p$, $FV_p$, $FP_p$) of each solar panel is determined based on the set of solar panel parameters of the corresponding solar panel and the one or more environmental parameters, the string level fault simulated Current-Voltage-Power dataset ($FC_s$, $FV_s$, $FP_s$) of each string is determined based on the solar panel level fault simulated Current-Voltage-Power dataset ($FC_p$, $FV_p$, $FP_p$) of each solar panel present in the corresponding string, the sub-array level fault simulated Current-Voltage-Power dataset ($FC_{sa}$, $FV_{sa}$, $FP_{sa}$) of each sub-array is determined based on the string level fault simulated Current-Voltage-Power dataset ($FC_s$, $FV_s$, $FP_s$) of each string present in the corresponding sub-array, the array level fault simulated Current-Voltage-Power dataset ($FC_a$, $FV_a$, $FP_a$) of each array is determined based on the sub-array level fault simulated Current-Voltage-Power dataset ($FC_{sa}$, $FV_{sa}$, $FP_{sa}$) of each sub-array present in the corresponding array, and the inverter level fault simulated Current-Voltage-Power dataset ($FC_i$, $FV_i$, $FP_i$) of each inverter is determined based on the corresponding array level fault simulated Current-Voltage-Power dataset ($FC_a$, $FV_a$, $FP_a$) and the one or more environmental parameters.

In an embodiment, the one or more fault types are selected from a group comprising of: a short circuit fault, an open circuit fault, a shading fault, a soiling fault, a hot-spot fault, an arc fault, a degradation fault, and a clipping fault, the short circuit fault comprises a line-line fault, and a line-ground fault, and the one or more fault locations comprises one or more solar panel level fault locations, one or more string level fault locations, one or more sub-array level fault locations, one or more array level fault locations, one or more inverter level fault locations, one or more circuit elements level fault locations, and one or more line level fault locations.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
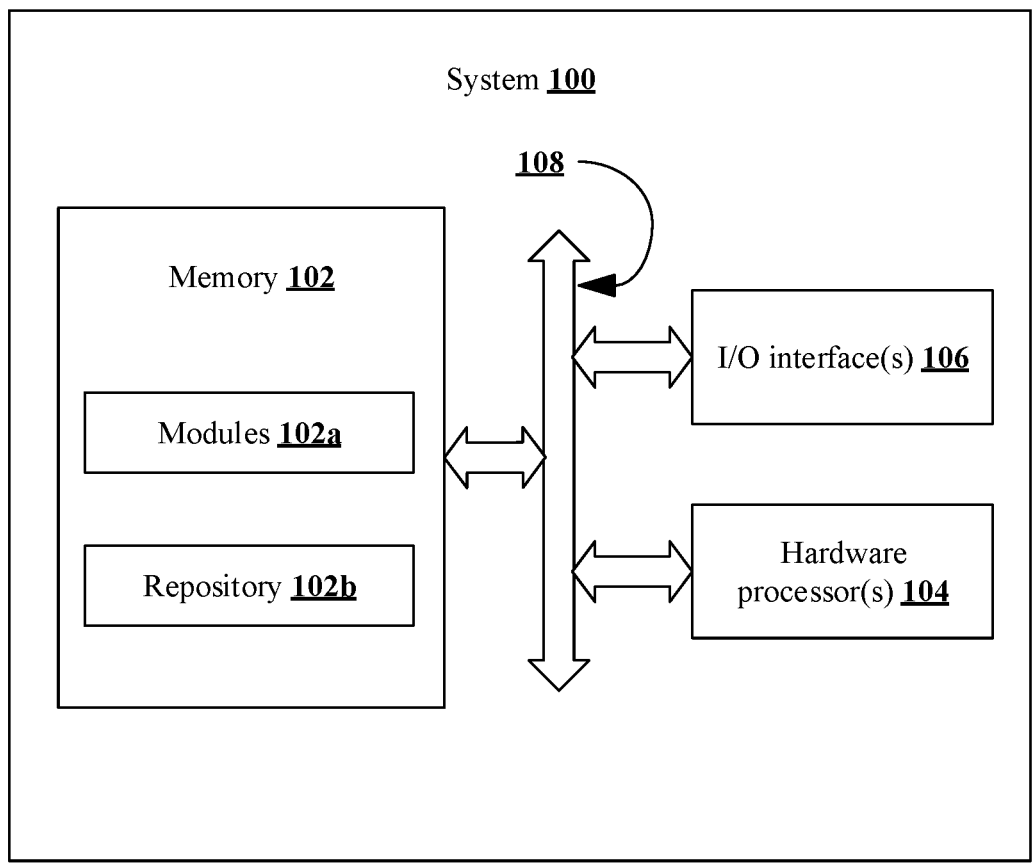
FIG. 1 is an exemplary functional block diagram of a system for fault detection, diagnosis and localization in a solar panel network, according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

In accordance with an embodiment of the present disclosure, the methods and systems for fault detection, diagnosis and localization in a solar panel network solve the problems of detecting various fault types present inside the solar panel network and identifying associated fault locations, by generating a fault detection, diagnosis and localization (FDDL) model. The FDDL model is trained with a plurality of fault datasets and a plurality of no-fault datasets covering a plurality of fault scenarios and a plurality of no-fault scenarios respectively. The plurality of fault datasets and the plurality of no-fault datasets are determined based on a network simulation model of the solar panel network.

In the context of the present disclosure, the expressions 'solar panel network' and 'solar panel network under test' may be interchangeably used based on the context. However, the 'solar panel network' becomes the 'solar panel network under test' when to be tested and monitored for the fault detection, diagnosis and localization.

Referring now to the drawings, and more particularly to FIG. 1 through FIG. 5, where similar reference characters denote corresponding features consistently throughout the figures, there are shown preferred embodiments and these embodiments are described in the context of the following exemplary systems and/or methods.

FIG. 1 is an exemplary functional block diagram of a system 100 for fault detection, diagnosis and localization in a solar panel network, according to some embodiments of the present disclosure. In an embodiment, the system 100 includes or is otherwise in communication with one or more hardware processors 104, communication interface device(s) or input/output (I/O) interface(s) 106, and one or more data storage devices or memory 102 operatively coupled to the one or more hardware processors 104. The one or more hardware processors 104, the memory 102, and the I/O interface(s) 106 may be coupled to a system bus 108 or a similar mechanism.

The I/O interface(s) 106 may include a variety of software and hardware interfaces, for example, a web interface, a graphical user interface, and the like. The I/O interface(s) 106 may include a variety of software and hardware interfaces, for example, interfaces for peripheral device(s), such as a keyboard, a mouse, an external memory, a plurality of sensor devices, a printer and the like. Further, the I/O interface(s) 106 may enable the system 100 to communicate with other devices, such as web servers and external databases.

The I/O interface(s) 106 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface(s) 106 may include one or more ports for connecting a number of computing systems with one another or to another server computer. Further, the I/O interface(s) 106 may include one or more ports for connecting a number of devices to one another or to another server.

The one or more hardware processors 104 may be implemented as one or more microprocessors, microcomputers, microcontrollers, digital signal processors, central processing units, state machines, logic circuitries, and/or any devices that manipulate signals based on operational instructions. Among other capabilities, the one or more hardware processors 104 are configured to fetch and execute computer-readable instructions stored in the memory 102.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, the memory 102 includes a plurality of modules 102A and a repository 102b for storing data processed, received, and generated by one or more of the plurality of modules 102A. The plurality of modules 102A may include routines, programs, objects, components, data structures, and so on, which perform particular tasks or implement particular abstract data types.

The plurality of modules 102A may include programs or computer-readable instructions or coded instructions that supplement applications or functions performed by the system 100. The plurality of modules 102A may also be used as, signal processor(s), state machine(s), logic circuitries, and/or any other device or component that manipulates signals based on operational instructions. Further, the plurality of modules 102A can be used by hardware, by computer-readable instructions executed by the one or more hardware processors 104, or by a combination thereof. In an embodiment, the plurality of modules 102A can include various sub-modules (not shown in FIG. 1).

The repository 102B may include a database or a data engine. Further, the repository 102B amongst other things, may serve as a database for storing the data that is processed, received, or generated as a result of the execution of the plurality of modules 102A. Although the repository 102B is shown internal to the system 100, it will be noted that, in alternate embodiments, the repository 102B can also be implemented external to the system 100, where the repository 102B may be stored within an external database (not shown in FIG. 1) communicatively coupled to the system 100. The data contained within such external database may be periodically updated. For example, new data may be added into the external database and/or existing data may be modified and/or non-useful data may be deleted from the external database. In one example, the data may be stored in an external system, such as a Lightweight Directory Access Protocol (LDAP) directory and a Relational Database Management System (RDBMS). In another embodiment, the data stored in the repository 102B may be distributed between the system 100 and the external database.

The solar panel network includes a plurality of solar panels and a plurality of circuit elements, arranged in a particular structure or order. In an embodiment, the solar panel network includes the plurality of solar panels arranged in the form of one or more arrays, along with the plurality of circuit elements. The plurality of circuit elements include one or more of: a combiner box, one or more lines, one or more blocking diodes, one or more bypass diodes, and one or more protection devices including one or more fuses, and one or more sensors, and one or more monitors. Further, the solar panel network includes one or more inverters.

Figure 2:
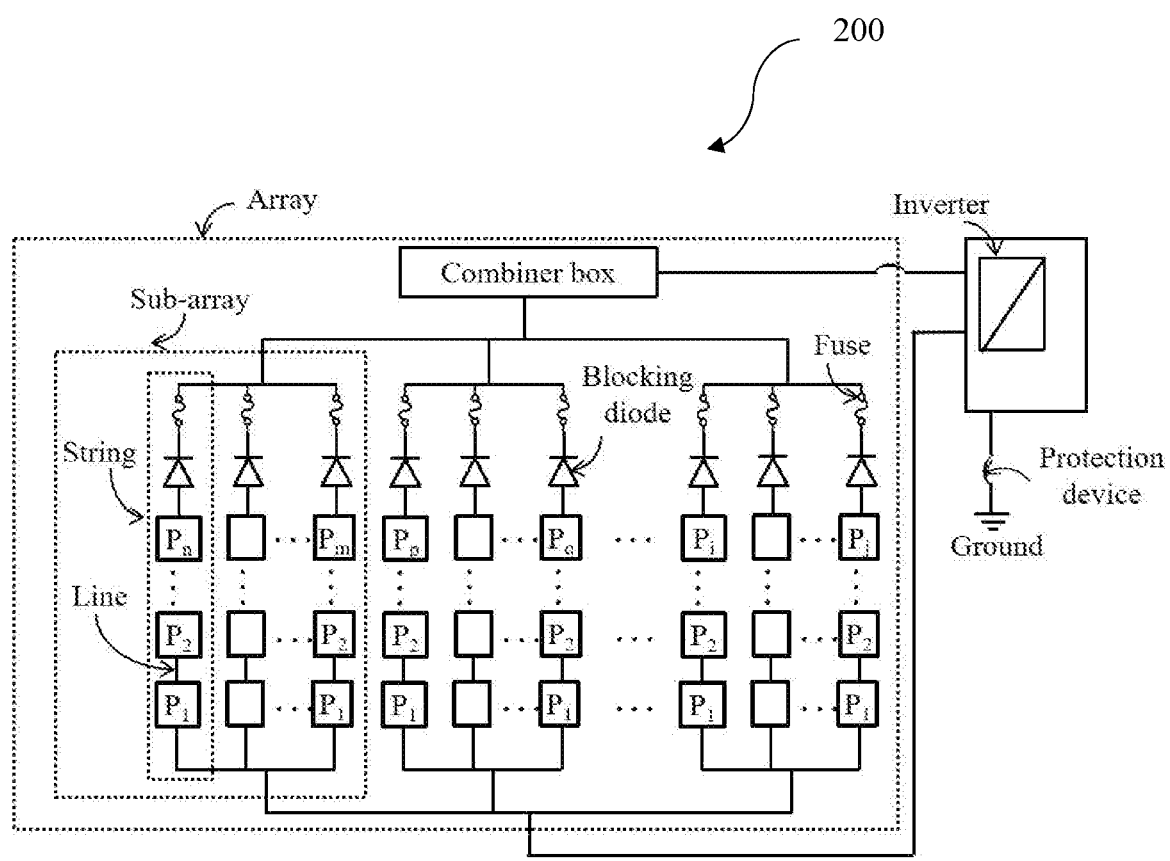
FIG. 2 is an exemplary block diagram of a solar panel network with a single array, according to some embodiments of the present disclosure.

FIG. 2 is an exemplary block diagram of a solar panel network 200 with a single array, according to some embodiments of the present disclosure. Each solar panel of the plurality of solar panels present in the solar panel network 200 includes a plurality of solar photo-voltaic (PV) cells typically arranged in a matrix format. The plurality of solar photo-voltaic (PV) cells may be connected in series or in parallel. The one or more solar panels that are connected in the series through one or more lines along with one or more circuit elements of the plurality of circuit elements, forms a string of the solar panel network 200. One or more strings that are connected in the form of a sub-network forms a sub-array of the solar panel network 200. One or more sub-arrays connected in a network along with one or more circuit elements of the plurality of circuit elements such as the combiner box, form the array of the solar panel network 200.

The solar panel network 200 may be connected to the one or more inverters. Each solar panel of the plurality of solar panels present in the solar panel network 200 may be different or same, and may be manufactured by a same company or by different companies. Specifications such as a size, a capacity, a configuration and performance characteristics of the each solar panel may be different or same, in the solar panel network 200. The solar panel network 200 with the single array is shown in FIG. 2 for simplicity, however the scope of the invention is not limited to one array. The solar panel network 200 may include one or more such arrays for generating the solar power in massive production.

Each solar panel present in the solar panel network 200 may be identified with an associated panel index, where the associated panel index may be defined based on a position of the solar panel present in the associated string, in the associated sub-array and in the associated array. Similarly, each circuit element present in the solar panel network 200 may be identified with an associated circuit element index, where the associated circuit element index may be defined based on a position of the circuit element present in the associated string, in the associated sub-array and in the associated array. In an embodiment, the solar panel network 200 to be tested and monitored for the fault detection, diagnosis and localization, may be connected to the system 100, through the I/O interface(s) 106.

Figure 3:
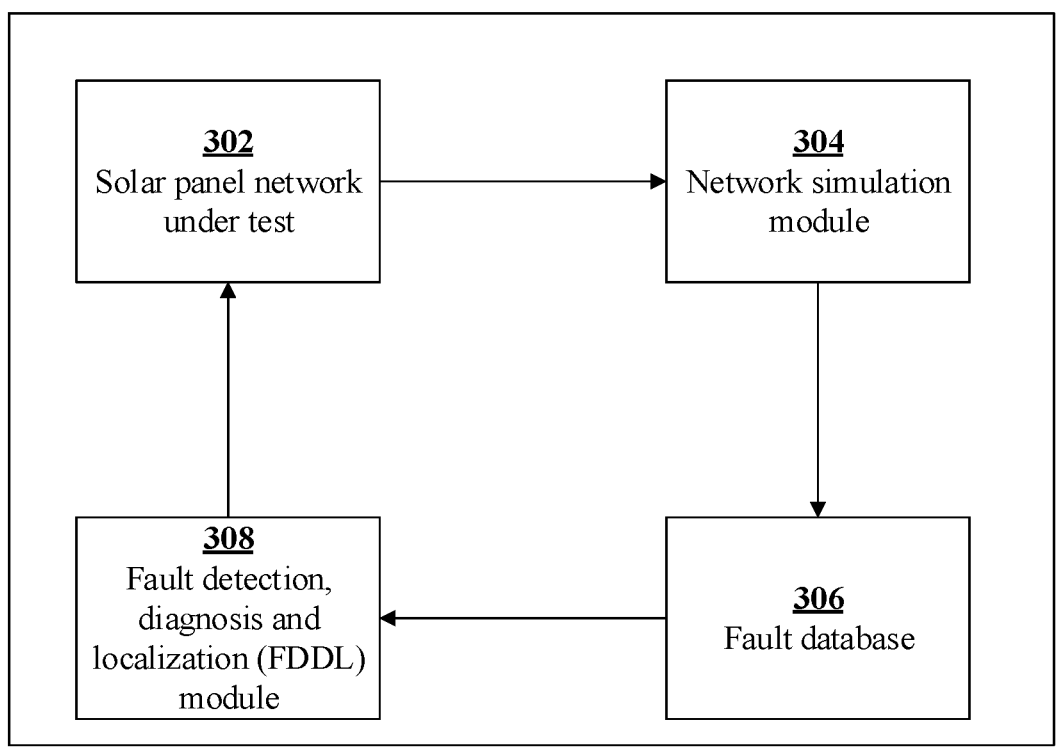
FIG. 3 is an exemplary block diagram illustrating modules of a system of FIG. 1 for fault detection, diagnosis and localization in a solar panel network, according to some embodiments of the present disclosure.
Figure 4A:
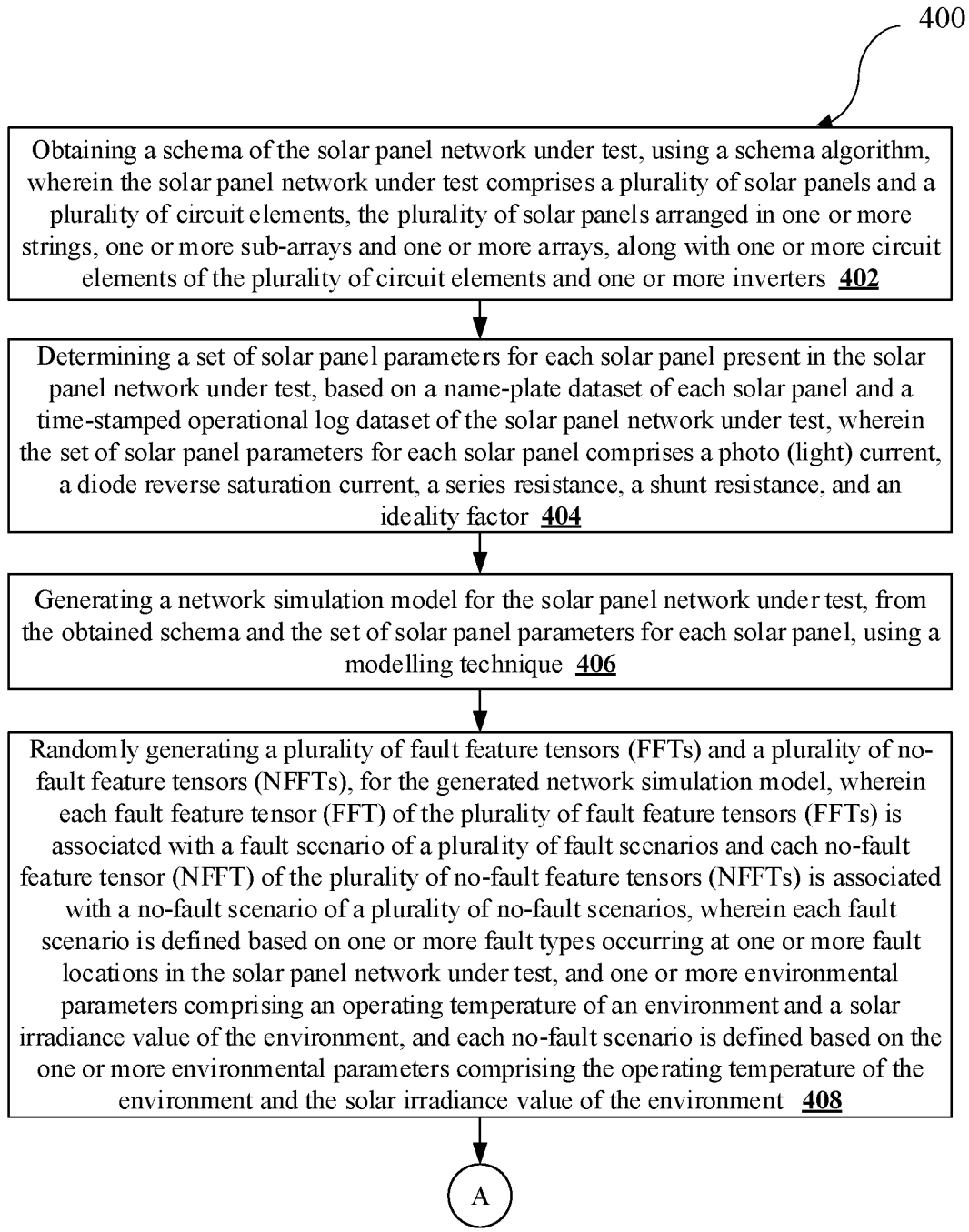
FIG. 4A and FIG. 4B illustrate exemplary flow diagrams of a processor-implemented method for fault detection, diagnosis and localization in a solar panel network, according to some embodiments of the present disclosure.
Figure 4B:
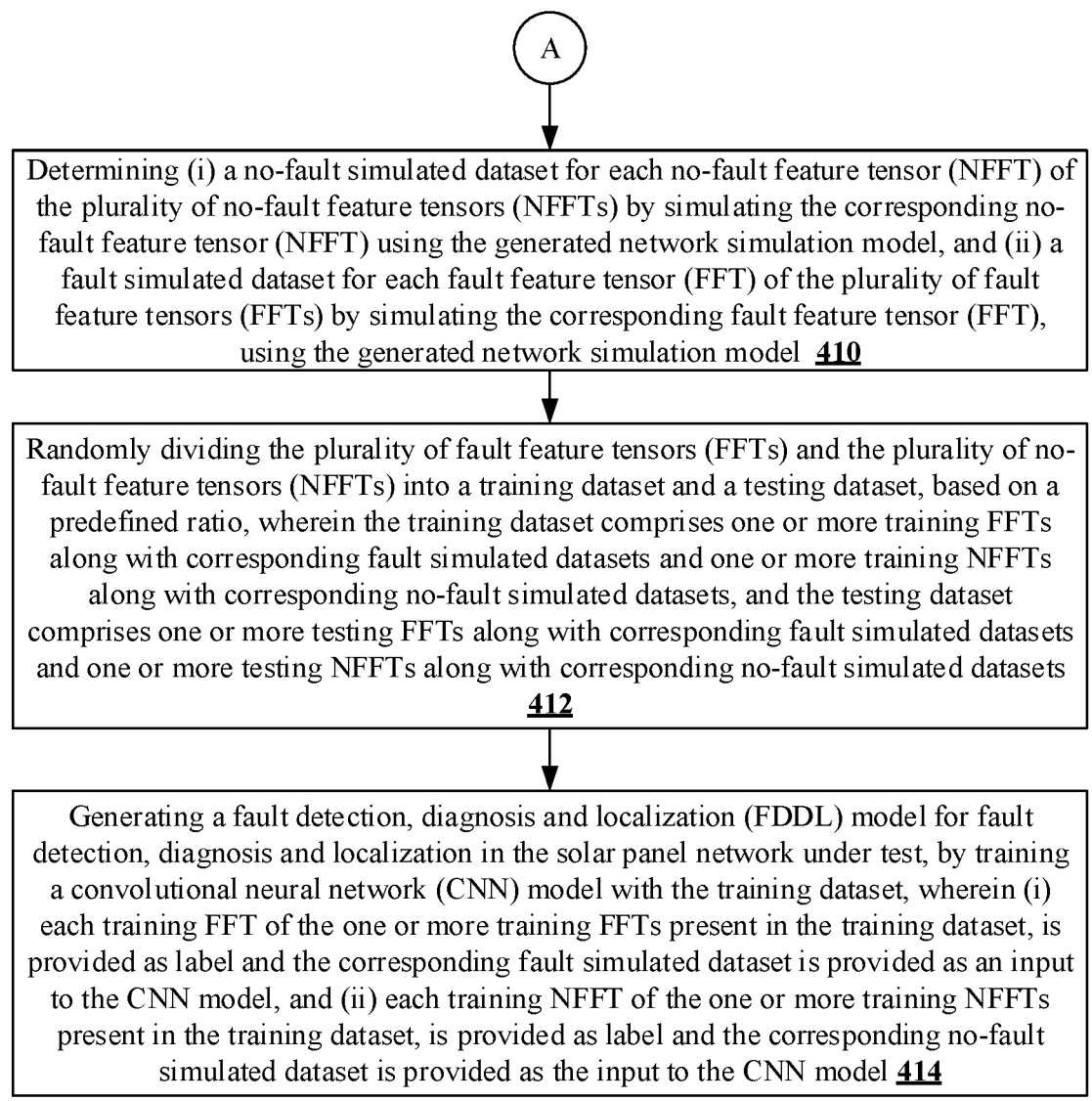

Referring collectively to FIG. 3, and FIG. 4A and FIG. 4B, components and functionalities of the system 100 are described in accordance with an example embodiment of the present disclosure. For example, FIG. 3 is an exemplary block diagram illustrating modules of the system 100 of FIG. 1 for fault detection, diagnosis and localization in the solar panel network, according to some embodiments of the present disclosure. As shown in FIG. 3, the modules include a solar panel network under test 302 (the solar panel network to be tested and monitored for the fault detection, diagnosis and localization, for example, the solar panel network 200 of FIG. 2), a network simulation module 304, a fault database 306, and a fault detection, diagnosis and localization (FDDL) module 308. In an embodiment, some of the modules of FIG. 3 may be stored in the plurality of modules 102A comprised in the memory 102 of the system 100. For example, the fault database 306 may be a part of the repository 102B comprised in the memory 102 of the system 100.

FIG. 4A and FIG. 4B illustrate exemplary flow diagrams of a processor-implemented method 400 for fault detection, diagnosis and localization in a solar panel network, according to some embodiments of the present disclosure. Although steps of the method 400 including process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any practical order. Further, some steps may be performed simultaneously or some steps may be performed alone independently.

At step 402 of the method 400, the one or more hardware processors 104 of the system 100 are configured to obtain a schema of the solar panel network under test 302 of FIG. 3 (for example, the solar panel network 200 of FIG. 2). A schema algorithm is used to obtain the schema of the solar panel network under test 302. The schema algorithm captures information about a skeleton structure of the solar panel network under test 302, that describes the arrangement of the plurality of solar panels in the one or more arrays, in the one or more sub-arrays, and in the one or more strings, and as well as the plurality of circuit elements. In an embodiment, the schema algorithm obtains the schema of the solar panel network under test 302, based on the associated panel index of each solar panel of the plurality of panels, the associated circuit element index of each circuit element of the plurality of circuit elements, and the associated inverter index of each inverter of the one or more inverters.

At step 404 of the method 400, the one or more hardware processors 104 of the system 100 are configured to determine a set of solar panel parameters for each solar panel present in the solar panel network under test 302. The set of solar panel parameters for each solar panel includes a photo (light) current ($I_L$), a diode reverse saturation current ($I_O$), a series resistance ($R_S$), a shunt resistance ($R_{SH}$), and an ideality factor (n). The set of solar panel parameters for each solar panel are determined based on a name-plate dataset of each solar panel and a time-stamped operational log dataset of the solar panel network under test 302, by solving a diode model equation of the solar panel.

In an embodiment, the one or more hardware processors 104 of the system 100 are configured to receive the name-plate dataset of each solar panel present in the solar panel network under test 302, from a user. The name-plate dataset of each solar panel includes a number of solar PV cells ($N_S$) present in the corresponding solar panel, an open circuit voltage ($V_{OC\text{-}SRC}$) at standard rating conditions, a short circuit current ($I_{SC\text{-}SRC}$) at standard rating conditions, a maximum power point voltage ($V_{MP\text{-}SRC}$) at standard rating conditions, and a maximum power point current ($I_{MP\text{-}SRC}$) at standard rating conditions. The name-plate dataset of each solar panel may be defined by the manufacturer of the corresponding solar panel. In an embodiment, the name-plate dataset of each solar panel is stored in the repository 102B comprised in the memory 102 of the system 100.

In an embodiment, the one or more hardware processors 104 of the system 100 are configured to receive the time-stamped operational log dataset of the solar panel network under test 302. The time-stamped operational log dataset of the solar panel network under test 302 includes operational history data of the solar panel network under test 302, along with the time-stamps over a period of time, for example, two years. The time-stamped operational log dataset of the solar panel network under test 302 includes one or more of: a solar panel-wise current and a solar panel-wise voltage of each solar panel, a string-wise current and a string-wise voltage of each string, a sub-array-wise current and a sub-array-wise voltage of each sub-array, an array-wise current and an array-wise voltage of each array, a set of voltages of each inverter (DC and AC) of the one or more inverters, a power output of each inverter, a solar irradiation value (G), a cloudiness value (C), a rainfall value (r), a solar panel temperature of each panel, a temperature of each inverter, and a set of fault currents. The set of fault currents indicates abnormal currents that are observed over a period of time. In an embodiment, the time-stamped operational log dataset of the solar panel network under test 302 is stored in the repository 102B comprised in the memory 102 of the system 100.

Any solar panel may be mathematically represented using a 5-parameter model which relates current and voltage of the associated solar panel in terms of the set of parameters: the photo (light) current ($I_L$), the diode reverse saturation current ($I_O$), the series resistance ($R_S$), the shunt resistance ($R_{SH}$), and the ideality factor (n). However, the set of parameters are specific to the type of solar panels used and to be determined based on the available data. The relation between the set of parameters, and current and voltage of the associated solar panel may be expressed in terms of a diode model equation 1:

$$I = I_L - I_O \left\{ e^{\left[\frac{V+IR_S}{nV_T}\right]} - 1 \right\} - \frac{V + IR_S}{R_{SH}} \quad (1)$$

Using the name-plate dataset of each solar panel, equation 1 may be further expressed as equation 2, equation 3 and equation 4:

$$I_{SC-SRC} = I_L - I_O \left\{ e^{\left[\frac{I_{SC-SRC}R_S}{nN_SV_T}\right]} - 1 \right\} - \frac{I_{SC-SRC}R_S}{R_{SH}} \quad (2)$$

$$0 = I_L - I_O \left\{ e^{\left[\frac{V_{OC}}{nN_SV_T}\right]} - 1 \right\} - \frac{V_{OC-SRC}}{R_{SH}} \quad (3)$$

$$I_{MP-SRC} = \quad (4)$$
$$I_L - I_O \left\{ e^{\left[\frac{V_{MP-SRC}+I_{MP-SRC}R_S}{nN_SV_T}\right]} - 1 \right\} - \frac{V_{MP-SRC} + I_{MP-SRC}R_S}{R_{SH}}$$

The series resistance ($R_S$) for each solar panel is numerically determined using a Newton-Raphson's method by assuming a predefined value for the ideality factor (n). Then, the ideality factor (n) is gradually tuned using the operational log data, until the calculated current and voltage characteristic matches with the current and voltage obtained from the operational log data. Using the determined series resistance ($R_S$) and the ideality factor (n), the other parameters from the set of parameters may be determined by solving the equations 2, 3 and 4.

At step 406 of the method 400, the one or more hardware processors 104 of the system 100 are configured to generate a network simulation model for the solar panel network under test 302. In an embodiment, the network simulation model is generated based on the obtained schema at step 402 of the method 400, and the set of parameters of each solar panel present in the solar panel network under test 302 determined at step 404 of the method 400.

In an embodiment, the network simulation module 304 may be configured by the one or more hardware processors 104 of the system 100 to generate the network simulation model for the solar panel network under test 302. In an embodiment, the network simulation module 304 includes a modelling technique such as a Matlab, or a simulation environment built on a programming language such as Python, C, and so on, for generating the network simulation model. The generated network simulation model is a digital twin or a replica to the solar panel network under test 302.

At step 408 of the method 400, the one or more hardware processors 104 of the system 100 are configured to randomly generate a plurality of fault feature tensors (FFTs) and a plurality of no-fault feature tensors (NFFTs), for the generated network simulation model obtained at step 406 of the method 400. Each fault feature tensor (FFT) of the plurality of fault feature tensors (FFTs) is associated with a fault scenario of a plurality of fault scenarios. Each fault scenario includes one or more fault types that may occur at one or more fault locations in the solar panel network under test 302. In an embodiment, a plurality of fault scenarios are randomly defined based on a number of one or more fault types that may occur at a number of the one or more possible fault locations in the solar panel network under test 302 and one or more environmental parameters. In an embodiment, the one or more environmental parameters are associated with weather conditions including an operating temperature of an environment and a solar irradiance value of the environment. In an embodiment, a predefined number of the plurality of fault scenarios may be 20,00,000.

In an embodiment, the one or more fault types are selected from a group including: a short circuit fault, an open circuit fault, a shading fault, a soiling fault, a hot-spot fault, an arc fault, a degradation fault, and a clipping fault. The short circuit fault may be a line-line fault or a line-ground fault. Further, the line-line fault may be an inter-string fault or an intra-string fault.

The one or more fault locations are associated with possible fault locations in the solar panel network under test 302. The one or more fault locations include one or more solar panel level fault locations, one or more string level fault locations, one or more sub-array level fault locations, one or more array level fault locations, one or more inverter level fault locations, one or more circuit elements level fault locations, and one or more line level fault locations.

For example, simulating some of the faults that may occur in the array is explained below. Consider the solar panel network having a single array with 4 strings that are connected in parallel. Each string has 4 solar panels connected in series. Under ideal conditions, each solar panel has similar characteristics. Therefore, each string has a total voltage of 4V (where V is the voltage of each solar panel), a total resistance as 4 R (where R is the resistance of each solar panel) and a current of I Amps. Hence, the total voltage of the array is 4V and the total current of the array is 4 I. Faults in the array represent an unhealthy or non-ideal conditions. Therefore, the characteristics of the solar panels/ strings under the faults may not be similar. Hence, to simulate the faults, the voltage (V) and current (I) of the solar panels in healthy condition are considered.

Short circuit fault: The short circuit fault occurs when the lines are shorted and the solar panel (s) associated with the shorting will have zero voltage. Hence, the voltage and resistance of the string with the short circuit fault may reduce to 3V and 3R from 4V and 4R respectively. The reduction may affect the other healthy strings. The voltage of the string under fault may be calculated based on the voltages of the solar panels without the fault. The short circuit fault is further classified into the line-line fault and the line-ground fault. The line-line fault is further classified into the intra-string fault and the inter-string fault.

Intra string fault: The intra string fault is the short circuit fault that occur within the same string. Voltage of the solar panel is zero when the lines across the associated solar panel are shorted. Hence the voltage of the string containing the intra string fault may be reduced. The current and voltage characteristic of the string having the intra string fault may be affected based on the presence/absence of the blocking diode.

Inter string fault: The inter string fault is the short circuit fault that occur between two different strings. The inter string fault causes the reduction of the current and voltage of the associated string. The solar panels having inter string fault may have reduced voltage, which causes the reduction of voltage in the associated string. The current and voltage characteristic of the string having the inter string fault may be affected based on the presence/absence of the blocking diode.

Line-ground fault: The line-ground fault may occur due to the short circuit between a line at one point and the ground at another point. For example, in the string of 4 solar panels, presence of line-ground fault between fourth line and the ground, affects the two solar panels in the string. Therefore, the voltage of the two solar panels becomes zero and hence the voltage of the string having the line-ground fault is reduced. The current and voltage characteristic of the string having line-ground fault may be affected based on the presence/absence of the blocking diode.

Open circuit fault: The open circuit fault may occur due to disconnection of the lines or the solar panels, or the entire string present the array. If open circuit fault occurs at first line in a string, then the whole string may not be able to produce the current. Therefore, the whole string is considered to be out of operation and only the remaining 3 strings are active in the array.

Degradation fault: The degradation fault may occur due to aging of the solar panels, poor connections, and one or more environmental factors associated with heat and moisture. The degradation fault may be modeled as increased resistance in the overall string. The voltage of the affected string may be calculated based on the change in the resistance and the panel currents.

Shading fault: The shading fault may occur when the solar irradiation falling on the solar panel is reduced. Consider the string having 4 solar panels out of which a single solar panel is partially shaded. The resultant string may be divided into 2 parts: shaded part and unshaded part. The shaded part may not produce as much as current as that of unshaded part. The currents and voltages from the shaded part are calculated based on the current and voltage from the unshaded part. Based on the obtained current and voltage, the voltage and the current of the other healthy strings are calculated. Thus, the voltage and current of the array may be determined.

Multiple faults in arrays: First, equivalent circuits for each single fault of the multiple faults in the same string are determined, and then the equivalent circuits of the strings with each single fault of multiple faults are put together in parallel to obtain the voltage and current of the array.

Exemplary fault scenario with multiple faults: Considered a solar panel network having the configuration of 1 array, 1 sub-array having 4 strings, and each string having 4 solar panels with a single blocking diode, and 6 lines. The exemplary fault scenario with multiple faults may be defined as: the fault scenario having the open circuit fault in the second line of first string, the degradation fault in the third solar panel present in the second string and the degradation fault and the shading fault together in the second solar panel present in the third string, and the line-ground fault in the third line of the fourth string.

Simulating various fault scenarios is non-trivial and complex in general. Especially, simulating the fault scenarios comprising of the multiple faults at the multiple locations is rather complex as individual faults do not only affect the location containing them in the solar panel network. Rather, they influence various other network elements in the other locations in the solar panel network. Therefore individual faults may not be simulated in isolation, rather entire fault scenario must be simulated as a whole, which is not straightforward.

Similarly, each no-fault scenario of the plurality of no-fault scenarios is defined based on the one or more environmental parameters. The one or more environmental parameters include an operating temperature of the environment and the solar irradiance value of the environment. In an embodiment, a predefined number of the plurality of no-fault scenarios may be 5,00,000.

Exemplary no-fault scenario: The no-fault scenario may be defined as: operating the solar panel network with environmental parameters including a specific solar irradiance value (G), for example, 800 w/m$^2$, and a specific operating temperature (T), for example, 32° C. The current and voltage characteristic of each solar panel is simulated with the specified environmental parameters and the solar panel parameters.

At step 410 of the method 400, the one or more hardware processors 104 of the system 100 are configured to determine (i) a no-fault simulated dataset for each no-fault feature tensor (NFFT) of the plurality of no-fault feature tensors (NFFTs), and (ii) a fault simulated dataset for each fault feature tensor (FFT) of the plurality of fault feature tensors (FFTs). The no-fault simulated dataset for each no-fault feature tensor (NFFT) of the plurality of no-fault feature tensors (NFFTs) is determined by simulating the corresponding no-fault feature tensor (NFFT) using the generated network simulation model obtained at step 406 of the method 400.

Further, the no-fault simulated dataset for each no-fault feature tensor (NFFT) is determined based on the set of solar panel parameters for each solar panel and the one or more environmental parameters, and using the generated network simulation model obtained at step 406 of the method 400. The no-fault simulated dataset for each no-fault feature tensor (NFFT) includes a solar panel level no-fault simulated Current-Voltage-Power dataset ($SC_p$, $SV_p$, $SP_p$) of each solar panel, a string level no-fault simulated Current-Voltage-Power dataset ($SC_s$, $SV_s$, $SP_s$) of each string, a sub-array level no-fault simulated Current-Voltage-Power dataset ($SC_{sa}$, $SV_{sa}$, $SP_{sa}$) of each sub-array, an array level no-fault simulated Current-Voltage-Power dataset ($SC_a$, $SV_a$, $SP_a$) of each array, and an inverter level no-fault simulated Current-Voltage-Power dataset ($SC_i$, $SV_i$, $SP_i$) of each inverter.

In an embodiment, the solar panel level no-fault simulated Current-Voltage-Power dataset ($SC_p$, $SV_p$, $SP_p$) of each solar panel is determined based on the set of parameters of the corresponding solar panel and the one or more environmental parameters. The solar panel level no-fault simulated Current-Voltage-Power dataset ($SC_p$, $SV_p$, $SP_p$) of each solar panel is determined using the diode model equation 1 mentioned at step 404 of the method 400.

In an embodiment, the string level no-fault simulated Current-Voltage-Power dataset ($SC_s$, $SV_s$, $SP_s$) of each string is determined based on the solar panel level no-fault simulated Current-Voltage-Power dataset ($SC_p$, $SV_p$, $SP_p$) of each solar panel present in the corresponding string. For example, a simulated string voltage ($SV_s$) is determined based on solar panel no-fault simulated voltage ($SV_p$) of each solar panel present in the corresponding string. More specifically, in the solar panel network 200 of FIG. 2, the no-fault simulated string voltage ($SV_s$) is determined by adding the solar panel no-fault simulated voltages ($SV_p$) of the plurality of solar panels present in the corresponding string. Similarly, a no-fault simulated string current ($SC_s$) is determined based on no-fault simulated solar panel current ($SC_p$) of each solar panel present in the corresponding string. More specifically, in the solar panel network 200 of FIG. 2, the no-fault simulated string current ($SC_s$) is equivalent to any no-fault simulated solar panel current ($SC_p$) of the plurality of solar panels present in the corresponding string. A no-fault simulated string power ($SP_s$) is determined based on the associated no-fault simulated string voltage ($SV_s$) and the associated no-fault simulated string current ($SC_s$). More specifically, in the solar panel network 200 of FIG. 2, the no-fault simulated string power ($SP_s$) is determined by multiplying the associated no-fault simulated string voltage ($SV_s$) with the associated no-fault simulated string current ($SC_s$).

In an embodiment, the sub-array level no-fault simulated Current-Voltage-Power dataset ($SC_{sa}$, $SV_{sa}$, $SP_{sa}$) of each sub-array is determined based on the string level no-fault simulated Current-Voltage-Power dataset ($SC_s$, $SV_s$, $SP_s$) of each string present in the corresponding sub-array. For example, a no-fault simulated sub-array voltage ($SV_{sa}$) is determined based on the no-fault simulated string voltage ($SV_s$) of each string present in the corresponding sub-array. More specifically, in the solar panel network 200 of FIG. 2, the no-fault simulated sub-array voltage ($SV_{sa}$) is equivalent to any no-fault simulated string voltage ($SV_s$) of the plurality of strings present in the corresponding sub-array. Similarly, a no-fault simulated sub-array current ($SC_{sa}$) is determined based on the no-fault simulated string current ($SC_s$) of each string present in the associated sub-array. More specifically, in the solar panel network 200 of FIG. 2, the no-fault simulated sub-array current ($SC_{sa}$) is determined by adding the no-fault simulated string currents ($SC_s$) of the plurality of strings present in the corresponding sub-array. A no-fault simulated sub-array power ($SP_{sa}$) is determined based on the associated no-fault simulated sub-array voltage ($SV_{sa}$) and the associated no-fault simulated sub-array current ($SC_{sa}$). More specifically, in the solar panel network 200 of FIG. 2, the no-fault simulated sub-array power ($SP_{sa}$) is determined by multiplying the associated no-fault simulated sub-array voltage ($SV_{sa}$) with the associated no-fault simulated sub-array current ($SC_{sa}$).

In an embodiment, the array level no-fault simulated Current-Voltage-Power dataset ($SC_a$, $SV_a$, $SP_a$) of each array is determined based on the sub-array level no-fault simulated Current-Voltage-Power dataset ($SC_{sa}$, $SV_{sa}$, $SP_{sa}$) of each sub-array present in the corresponding array. For example, a no-fault simulated array voltage ($SV_a$) is determined based on the no-fault simulated sub-array voltage ($SV_{sa}$) of each sub-array present in the array. More specifically, in the solar panel network 200 of FIG. 2, the no-fault simulated array voltage ($SV_a$) is equivalent to any no-fault simulated sub-array voltage ($SV_{sa}$) of the plurality of sub-arrays present in the corresponding array. Similarly, a no-fault simulated array current ($SC_a$) is determined based on the no-fault simulated sub-array current ($SC_{sa}$) of each sub-array present in the corresponding array. More specifically, in the solar panel network 200 of FIG. 2, the no-fault simulated array current ($SC_a$) is determined by adding the no-fault simulated sub-array currents ($SC_{sa}$) of the plurality of sub-arrays present in the corresponding array. A no-fault simulated array power ($SP_a$) is determined based on the no-fault simulated array voltage ($SV_a$) and the no-fault simulated array current ($SC_a$). More specifically, in the solar panel network 200 of FIG. 2, the no-fault simulated array power ($SP_a$) is determined by multiplying the no-fault simulated array voltage ($SV_a$) with the no-fault simulated array current ($SC_a$).

The inverter level simulated Current-Voltage-Power dataset ($SC_i$, $SV_i$, $SP_i$) of each inverter is determined based on the corresponding array level simulated Current-Voltage-Power dataset ($SC_a$ $SV_a$, $SP_a$) and the one or more environmental parameters.

Similarly, the fault simulated dataset for each fault feature tensor (FFT) of the plurality of fault feature tensors (FFTs) is determined by simulating the corresponding fault feature tensor (FFT) using the generated network simulation model obtained at step 406 of the method 400. Further, the fault simulated dataset for each fault feature tensor (FFT) is determined based on the set of solar panel parameters for each solar panel and the one or more environmental parameters, and using the generated network simulation model obtained at step 406 of the method 400.

The fault simulated dataset for each fault feature tensor (FFT) includes a solar panel level fault simulated Current-Voltage-Power dataset ($FC_p$, $FV_p$, $FP_p$) of each solar panel, a string level fault simulated Current-Voltage-Power dataset ($FC_s$, $FV_s$, $FP_s$) of each string, a sub-array level fault simulated Current-Voltage-Power dataset ($FC_{sa}$, $FV_{sa}$, $FP_{sa}$) of each sub-array, an array level fault simulated Current-Voltage-Power dataset ($FC_a$, $FV_a$, $FP_a$) of each array, and an inverter level fault simulated Current-Voltage-Power dataset ($FC_i$, $FV_i$, $FP_i$) of each inverter.

The fault simulated dataset for each fault feature tensor (FFT) is determined with a same approach as that of the no-fault simulated dataset for each no-fault feature tensor (NFFT), however under the corresponding fault scenario. Broadly, the solar panel level fault simulated Current-Voltage-Power dataset ($FC_p$, $FV_p$, $FP_p$) of each solar panel is determined based on the set of solar panel parameters of the corresponding solar panel and the one or more environmental parameters. The string level fault simulated Current-Voltage-Power dataset ($FC_p$, $FV_p$, $FP_p$) of each string is determined based on the solar panel level fault simulated Current-Voltage-Power dataset ($FC_p$, $FV_p$, $FP_p$) of each solar panel present in the corresponding string.

The sub-array level fault simulated Current-Voltage-Power dataset ($FC_{sa}$, $FV_{sa}$, $FP_{sa}$) of each sub-array is determined based on the string level fault simulated Current-Voltage-Power dataset ($FC_s$, $FV_s$, $FP_s$) of each string present in the corresponding sub-array. The array level fault simulated Current-Voltage-Power dataset ($FC_a$, $FV_a$, $FP_a$) of each array is determined based on the sub-array level fault simulated Current-Voltage-Power dataset ($FC_{sa}$, $FV_{sa}$, $FP_{sa}$) of each sub-array present in the corresponding array. The inverter level fault simulated Current-Voltage-Power dataset ($FC_i$, $FV_i$, $FP_i$) of each inverter is determined based on the corresponding array level fault simulated Current-Voltage-Power dataset ($FC_a$, $FV_a$, $FP_a$) and the one or more environmental parameters.

In an embodiment, the one or more hardware processors 104 of the system 100 are configured to generate a fault database (306 of FIG. 3) after simulating the plurality of no-fault scenarios and the plurality of no-fault scenarios, using the network simulation model 304. In an embodiment, the fault database 306 includes the no-fault simulated dataset for each no-fault feature tensor (NFFT) of the plurality of no-fault feature tensors (NFFTs) and the fault simulated dataset for each fault feature tensor (FFT) of the plurality of fault feature tensors (FFTs). In an embodiment, the fault database 306 may be stored in the repository 102b of the system 100.

At step 412 of the method 400, the one or more hardware processors 104 of the system 100 are configured to randomly divide the plurality of fault feature tensors (FFTs) and the plurality of no-fault feature tensors (NFFTs) into a training dataset and a testing dataset, based on a predefined ratio. The training dataset includes one or more training FFTs along with corresponding fault simulated datasets, and one or more training NFFTs along with corresponding no-fault simulated datasets. Similarly, the testing dataset include one or more testing FFTs along with corresponding fault simulated datasets and one or more testing NFFTs along with corresponding no-fault simulated datasets. The one or more training FFTs present in the training dataset, are the some of the FFTs from the plurality of FFTs. The one or more training NFFTs present in the training dataset, are the some of the NFFTs from the plurality of NFFTs. Similarly, The one or more testing FFTs present in the testing dataset, are the some of the FFTs from the plurality of FFTs. The one or more testing NFFTs present in the testing dataset, are the some of the NFFTs from the plurality of NFFTs.

In an embodiment, the predefined ratio defines the ratio of: (i) a number of the one or more training FFTs and the one or more training NFFTs present in the training dataset, and (ii) a number of the one or more testing FFTs and the one or more testing NFFTs present in the testing dataset. In an embodiment, the predefined ratio may be defined by the user and the predefined ratio may be 4:1.

At step 414 of the method 400, the one or more hardware processors 104 of the system 100 are configured to generate a fault detection, diagnosis and localization (FDDL) model for fault detection, diagnosis and localization in the solar panel network under test 302, using the training dataset obtained at step 412 of the method 400. The fault detection, diagnosis and localization (FDDL) module (308 of FIG. 3) include a convolutional neural network (CNN) model which is trained with the training dataset to generate the fault detection, diagnosis and localization (FDDL) model. Each training FFT of the one or more training FFTs present in the training dataset, is provided as label and the corresponding fault simulated dataset is provided as an input to the CNN model during the training. Also each training NFFT of the one or more training NFFTs present in the training dataset, is provided as label and the corresponding no-fault simulated dataset is provided as the input to the CNN model during the training. In an embodiment, the one or more training FFTs and the one or more training NFFTs may be combined to form an integrated training feature vector before providing to the CNN model during the training. Similarly, the corresponding fault simulated datasets and the corresponding no-fault simulated datasets may be combined to form an integrated training dataset before providing to the CNN model during the training.

Figure 5:
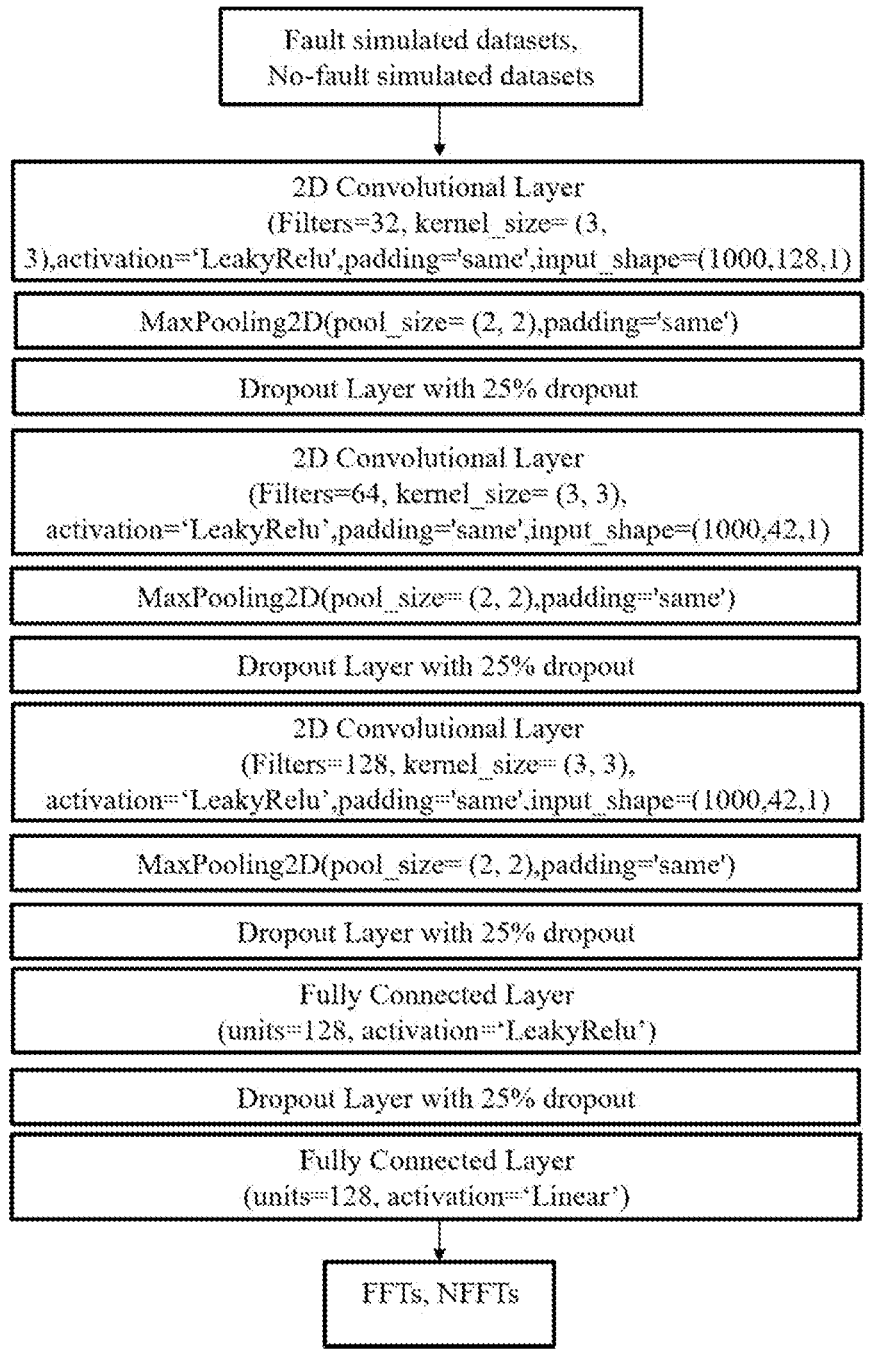
FIG. 5 shows an architecture of a convolutional neural network (CNN) model which is trained to generate a fault detection, diagnosis and localization (FDDL) model for fault detection, diagnosis and localization in a solar panel network, according to some embodiments of the present disclosure.

FIG. 5 shows an architecture of a convolutional neural network (CNN) model which is trained to generate a fault detection, diagnosis and localization (FDDL) model for fault detection, diagnosis and localization in a solar panel network, according to some embodiments of the present disclosure. The CNN model includes three 2-dimensional convolutional layers each connected with a max-pooling layer and a dropout layer, and two fully connected layers connected with the dropout layer.

The first 2-dimensional (2-D) convolutional layer includes 32 filters, a kernel size is (3, 3), activation used is LeakyRelu, and input shape (1000, 128, 1). The second 2-dimensional convolutional layer includes 64 filters, a kernel size is (3, 3), activation used is LeakyRelu, and input shape (1000, 42, 1). The third 2-dimensional convolutional layer includes 128 filters, a kernel size is (3, 3), activation used is LeakyRelu, and input shape (1000, 42, 1). All the max-pooling layers are 2-dimensional (2-D) with the pooling size of (2, 2). All the dropout layers are with dropout rate of 25%. Each fully connected layer includes 128 units (neurons). The first fully connected layer uses 'LeakyRelu' activation whereas the second fully connected layer uses 'linear' activation.

A mean squared error regressive loss function may be defined to minimize an error (i) between each training FFT and a predicted label associated with the corresponding fault simulated dataset, and (ii) between each training NFFT and a predicted label associated with the corresponding no-fault simulated dataset, during the training, so that hyper-parameters of the CNN model are fine tuned during the learning and are optimized at the end of the training.

The fault detection, diagnosis and localization (FDDL) module 308 is connected with the fault database (306 of FIG. 3) to receive corresponding FFTs and NFFTs along with respective fault simulated datasets and respective no-fault simulated datasets present in the training dataset. The generated FDDL model at this step is used to test and monitor the solar panel network under test 302 for the fault detection, diagnosis and localization. More specifically, the generated FDDL model detects the fault (s) and then detects the type of fault(s). Once the fault(s) and fault type(s) are detected, the generated FDDL model detect the location of the fault(s) for the diagnosis and to take for further actions.

At step 416 of the method 400, the one or more hardware processors 104 of the system 100 are further configured to test the generated FDDL model obtained at step 414 of the method 400, with the testing dataset. During testing, each testing FFT of the one or more testing FFTs present in the testing dataset, is provided as the label and the corresponding fault simulated dataset is provided as the input to the generated FDDL model. Also each testing NFFT of the one or more testing NFFTs present in the testing dataset, is provided as the label and the corresponding no-fault simulated dataset is provided as the input to the CNN model The testing process is carried out to evaluate the performance of the generated FDDL model. The performance of the generated FDDL model may be evaluated based on one or more parameters such as accuracy, speed, resource utilization and so on. Based on the evaluation, the generated FDDL model maybe further trained by fine-tuning the one or more hyper-parameters of the generated FDDL model.

In an embodiment, the one or more testing FFTs and the one or more testing NFFTs may be combined to form an integrated testing feature vector before providing to the CNN model during the training. Similarly, the corresponding fault simulated datasets and the corresponding no-fault simulated datasets may be combined to form an integrated testing dataset before providing to the CNN model during the training.

In the context of the present disclosure, the CNN model is trained for generating the FDDL model. However, the scope of the invention is not limited to the CNN model. In place of the CNN model, an artificial intelligence (AI) based models such as decision trees, an artificial neural network (ANN), a recurrent neural network (RNN), classification algorithms such as a support vector machines (SVM) may be used to generate the FDDL model.

In accordance with an embodiment of the present disclosure, the network simulation model generated at step 406 of the method 400 is obtained using the both name-plate dataset of each solar panel and the operational log dataset of the solar panel network. Hence the network simulation model is efficient, accurate, and resembles an exact replica of the solar panel network under test 302 in terms of the configuration and the skeleton structure. The network simulation model is used for various applications including a fault detection, diagnosis and localization, performance bench-marking of the solar panel network under test 302, soft sensing, control applications and so on, as network simulation model is a replica of the solar panel network under test 302.

Various fault types occurring at multiple possible locations in the solar panel network are simulated using the network simulation model. The dataset covering multiple fault scenarios and multiple no-fault scenarios is determined for training the CNN model. The fault scenarios include one fault type alone at particular location or multiple locations, as well as multiple fault types at multiple locations. The fault types include a short circuit fault, an open circuit fault, a shading fault, a soiling fault, a hot-spot fault, an arc fault, a degradation fault, and a clipping fault, the short circuit fault comprises a line-line fault, and a line-ground fault. The fault locations include one or more solar panel level fault locations, one or more string level fault locations, one or more sub-array level fault locations, one or more array level fault locations, one or more inverter level fault locations, one or more circuit elements level fault locations, and one or more line level fault locations. Hence the FDDL model generated at step 414 of the method 400 is efficient and accurate in detection, diagnosis and localization of the one or more faults present in the solar panel network under test 302.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented method for fault detection, diagnosis and localization in a solar panel network under test, the method comprising the steps of:

obtaining, via one or more hardware processors, a schema of the solar panel network under test, using a schema algorithm, the schema algorithm being able to capture information about a skeleton structure of the solar panel network under test, wherein the solar panel network under test comprises a plurality of solar panels and a plurality of circuit elements, the plurality of solar panels arranged in one or more strings, one or more sub-arrays and one or more arrays, along with one or more circuit elements of the plurality of circuit elements and one or more inverters;

determining, via the one or more hardware processors, a set of solar panel parameters for each solar panel present in the solar panel network under test, based on a name-plate dataset of each solar panel and a time-stamped operational log dataset of the solar panel network under test, wherein the set of solar panel parameters for each solar panel comprises a photo (light) current ($I_L$), a diode reverse saturation current ($I_O$), a series resistance ($R_S$), a shunt resistance ($R_{SH}$), and an ideality factor (n);

generating, via the one or more hardware processors, a network simulation model for the solar panel network under test, from the obtained schema and the set of solar panel parameters for each solar panel, using a modelling technique;

randomly generating, via the one or more hardware processors, a plurality of fault feature tensors (FFTs) and a plurality of no-fault feature tensors (NFFTs), for the generated network simulation model, wherein each fault feature tensor (FFT) of the plurality of fault feature tensors (FFTs) is associated with a fault scenario of a plurality of fault scenarios and each no-fault feature tensor (NFFT) of the plurality of no-fault feature tensors (NFFTs) is associated with a no-fault scenario of a plurality of no-fault scenarios, wherein each fault scenario is defined based on one or more fault types occurring at one or more fault locations in the solar panel network under test, and one or more environmental parameters comprising an operating temperature of an environment and a solar irradiance value of the environment, and each no-fault scenario is defined based on the one or more environmental parameters comprising the operating temperature of the environment and the solar irradiance value of the environment;

determining, via the one or more hardware processors, (i) a no-fault simulated dataset for each no-fault feature tensor (NFFT) of the plurality of no-fault feature tensors (NFFTs) by simulating the corresponding no-fault feature tensor (NFFT) using the generated network simulation model, and (ii) a fault simulated dataset for each fault feature tensor (FFT) of the plurality of fault feature tensors (FFTs) by simulating the corresponding fault feature tensor (FFT), using the generated network simulation model;

randomly dividing, via the one or more hardware processors, the plurality of fault feature tensors (FFTs) and the plurality of no-fault feature tensors (NFFTs) into a training dataset and a testing dataset, based on a pre-defined ratio, wherein the training dataset comprises one or more training FFTs along with corresponding fault simulated datasets and one or more training NFFTs along with corresponding no-fault simulated datasets, and the testing dataset comprises one or more testing FFTs along with corresponding fault simulated datasets and one or more testing NFFTs along with corresponding no-fault simulated datasets;

generating, via the one or more hardware processors, a fault detection, diagnosis and localization (FDDL) model for fault detection, diagnosis and localization in the solar panel network; and training a convolutional neural network (CNN) model with the training dataset, wherein (i) each training FFT of the one or more training FFTs present in the training dataset, is provided as label and the corresponding fault simulated dataset is provided as an input to the CNN model, and (ii) each training NFFT of the one or more training NFFTs present in the training dataset, is provided as label and the corresponding no-fault simulated dataset is provided as the input to the CNN model.

2. The method of claim 1, further comprising testing, via the one or more hardware processors, the generated FDDL model with the testing dataset, wherein (i) each testing FFT of the one or more testing FFTs present in the testing dataset, is provided as the label and the corresponding fault simulated dataset is provided as the input to the generated FDDL model, and each testing NFFT of the one or more testing NFFTs present in the testing dataset, is provided as the label and the corresponding no-fault simulated dataset is provided as the input to the CNN model.

3. The method of claim 1, wherein the CNN model comprises three 2-dimensional convolutional layers each connected with a max-pooling layer and a dropout layer, and two fully connected layers connected with the dropout layer.

4. The method of claim 1, wherein the name-plate dataset of each solar panel present in the solar panel network under test, comprises a number of PV cells ($N_S$) present in the corresponding solar panel, an open circuit voltage ($V_{OC\text{-}SRC}$), a short circuit current ($I_{SC\text{-}SRC}$), a maximum power point voltage ($V_{MP\text{-}SRC}$), and a maximum power point current ($I_{MP\text{-}SRC}$), at standard rating conditions, and the time-stamped operational log dataset of the solar panel network under test, comprises one or more of: a solar panel-wise current and a solar panel-wise voltage of each solar panel, a string-wise current and a string-wise voltage of each string, a sub-array-wise current and a sub-array-wise voltage of each sub-array, an array-wise current and an array-wise voltage of each array, a set of voltages of each inverter (DC and AC) of the one or more inverters, a power output of each inverter, a solar irradiation value (G), a cloudiness value (C), a rainfall value (r), a solar panel temperature of each solar panel, a temperature of each inverter, and a set of fault currents.

5. The method of claim 1, wherein the no-fault simulated dataset for each no-fault feature tensor (NFFT) is determined based on the set of solar panel parameters for each solar panel and the one or more environmental parameters, and comprises a solar panel level no-fault simulated Current-Voltage-Power dataset ($SC_p$, $SV_p$, $SP_p$) of each solar panel, a string level no-fault simulated Current-Voltage-Power dataset ($SC_s$, $SV_s$, $SP_s$) of each string, a sub-array level no-fault simulated Current-Voltage-Power dataset ($SC_{sa}$, $SV_{sa}$, $SP_{sa}$) of each sub-array, an array level no-fault simulated Current-Voltage-Power dataset ($SC_a$, $SV_a$, $SP_a$) of each array, and an inverter level no-fault simulated Current-Voltage-Power dataset ($SC_i$, $SV_i$, $SP_i$) of each inverter.

6. The method of claim 5, wherein the solar panel level no-fault simulated Current-Voltage-Power dataset ($SC_p$, $SV_p$, $SP_p$) of each solar panel is determined based on the set of parameters of the corresponding solar panel and the one or more environmental parameters, the string level no-fault simulated Current-Voltage-Power dataset ($SC_s$, $SV_s$, $SP_s$) of each string is determined based on the solar panel level Current-Voltage-Power dataset ($SC_p$, $SV_p$, $SP_p$) of each solar panel present in the corresponding string, the sub-array level no-fault simulated Current-Voltage-Power dataset ($SC_{sa}$, $SV_{sa}$, $SP_{sa}$) of each sub-array is determined based on the string level no-fault simulated Current-Voltage-Power dataset ($SC_s$, $SV_s$, $SP_s$) of each string present in the corresponding sub-array, the array level no-fault simulated Current-Voltage-Power dataset ($SC_a$, $SV_a$, $SP_a$) of each array is determined based on the sub-array level no-fault simulated Current-Voltage-Power dataset ($SC_{sa}$, $SV_{sa}$, $SP_{sa}$) of each sub-array present in the corresponding array, and the inverter level no-fault simulated Current-Voltage-Power dataset ($SC_i$, $SV_i$, $SP_i$) of each inverter is determined based on the corresponding array level no-fault simulated Current-Voltage-Power dataset ($SC_a$, $SV_a$, $SP_a$) and the one or more environmental parameters.

7. The method of claim 1, wherein the fault simulated dataset for each fault feature tensor (FFT) is determined based on the set of solar panel parameters for each solar panel and the one or more environmental parameters, and comprises a solar panel level fault simulated Current-Voltage-Power dataset ($FC_p$, $FV_p$, $FP_p$) of each solar panel, a string level fault simulated Current-Voltage-Power dataset ($FC_s$, $FV_s$, $FP_s$) of each string, a sub-array level fault simulated Current-Voltage-Power dataset ($FC_{sa}$, $FV_{sa}$, $FP_{sa}$) of each sub-array, an array level fault simulated Current-Voltage-Power dataset ($FC_a$, $FV_a$, $FP_a$) of each array, and an inverter level fault simulated Current-Voltage-Power dataset ($FC_i$, $FV_i$, $FP_i$) of each inverter.

8. The method of claim 7, wherein the solar panel level fault simulated Current-Voltage-Power dataset ($FC_p$, $FV_p$, $FP_p$) of each solar panel is determined based on the set of solar panel parameters of the corresponding solar panel and the one or more environmental parameters, the string level fault simulated Current-Voltage-Power dataset ($FC_s$, $FV_s$, $FP_s$) of each string is determined based on the solar panel level fault simulated Current-Voltage-Power dataset ($FC_p$, $FV_p$, $FP_p$) of each solar panel present in the corresponding string, the sub-array level fault simulated Current-Voltage-Power dataset ($FC_{sa}$, $FV_{sa}$, $FP_{sa}$) of each sub-array is determined based on the string level fault simulated Current-Voltage-Power dataset ($FC_s$, $FV_s$, $FP_s$) of each string present in the corresponding sub-array, the array level fault simulated Current-Voltage-Power dataset ($FC_a$, $FV_a$, $FP_a$) of each array is determined based on the sub-array level fault simulated Current-Voltage-Power dataset ($FC_{sa}$, $FV_{sa}$, $FP_{sa}$) of each sub-array present in the corresponding array, and the inverter level fault simulated Current-Voltage-Power dataset ($FC_i$, $FV_i$, $FP_i$) of each inverter is determined based on the corresponding array level fault simulated Current-Voltage-Power dataset ($FC_a$, $FV_a$, $FP_a$) and the one or more environmental parameters.

9. The method of claim 1, wherein the one or more fault types are selected from a group comprising of: a short circuit fault, an open circuit fault, a shading fault, a soiling fault, a hot-spot fault, an arc fault, a degradation fault, and a clipping fault, the short circuit fault comprises a line-line fault, and a line-ground fault, and the one or more fault locations comprises one or more solar panel level fault locations, one or more string level fault locations, one or more sub-array level fault locations, one or more array level fault locations, one or more inverter level fault locations, one or more circuit elements level fault locations, and one or more line level fault locations.

10. A system for fault detection, diagnosis and localization in a solar panel network under test, the system comprising:
a memory storing instructions;
one or more Input/Output (I/O) interfaces; and
one or more hardware processors coupled to the memory via the one or more I/O interfaces, wherein the one or more hardware processors are configured by the instructions to:
obtain a schema of the solar panel network under test, the schema algorithm being able to capture information about a skeleton structure of the solar panel network under test, using a schema algorithm, wherein the solar panel network under test comprises a plurality of solar panels and a plurality of circuit elements, the plurality of solar panels arranged in one or more strings, one or more sub-arrays and one or more arrays, along with one or more circuit elements of the plurality of circuit elements and one or more inverters;
determine a set of solar panel parameters for each solar panel present in the solar panel network under test, based on a name-plate dataset of each solar panel and a time-stamped operational log dataset of the solar panel network under test, wherein the set of solar panel parameters for each solar panel comprises a photo (light) current ($I_L$), a diode reverse saturation current ($I_O$), a series resistance ($R_S$), a shunt resistance ($R_{SH}$), and an ideality factor (n);
generate a network simulation model for the solar panel network under test, from the obtained schema and the set of solar panel parameters for each solar panel, using a modelling technique;
randomly generate a plurality of fault feature tensors (FFTs) and a plurality of no-fault feature tensors (NFFTs), for the generated network simulation model, wherein each fault feature tensor (FFT) of the plurality of fault feature tensors (FFTs) is associated with a fault scenario of a plurality of fault scenarios and each no-fault feature tensor (NFFT) of the plurality of no-fault feature tensors (NFFTs) is associated with a no-fault scenario of a plurality of no-fault scenarios, wherein each fault scenario is defined based on one or more fault types occurring at one or more fault locations in the solar panel network under test, and one or more environmental parameters comprising an operating temperature of an environment and a solar irradiance value of the environment, and each no-fault scenario is defined based on the one or more environmental parameters comprising the operating temperature of the environment and the solar irradiance value of the environment;
determine (i) a no-fault simulated dataset for each no-fault feature tensor (NFFT) of the plurality of no-fault feature tensors (NFFTs) by simulating the corresponding no-fault feature tensor (NFFT) using the generated network simulation model, and (ii) a fault simulated dataset for each fault feature tensor (FFT) of the plurality of fault feature tensors (FFTs) by simulating the corresponding fault feature tensor (FFT), using the generated network simulation model;
randomly divide the plurality of fault feature tensors (FFTs) and the plurality of no-fault feature tensors (NFFTs) into a training dataset and a testing dataset, wherein the training dataset comprises one or more training FFTs along with corresponding fault simulated datasets and one or more training NFFTs along with corresponding no-fault simulated datasets, and the testing dataset comprises one or more testing FFTs along with corresponding fault simulated datasets and one or more testing NFFTs along with corresponding no-fault simulated datasets; and generate a fault detection, diagnosis and localization (FDDL) model for fault detection, diagnosis and localization in the solar panel network; and training a convolutional neural network (CNN) model with the training dataset, wherein (i) each training FFT of the one or more training FFTs present in the training dataset, is provided as label and the corresponding fault simulated dataset is provided as an input to the CNN model, and (ii) each training NFFT of the one or more training NFFTs present in the training dataset, is provided as label and the corresponding no-fault simulated dataset is provided as the input to the CNN model.

11. The system of claim 10, wherein the one or more hardware processors are further configured to test the generated FDDL model with the testing dataset, wherein (i) each testing FFT of the one or more testing FFTs present in the testing dataset, is provided as the label and the corresponding fault simulated dataset is provided as the input to the generated FDDL model, and (ii) each testing NFFT of the one or more testing NFFTs present in the testing dataset, is provided as the label and the corresponding no-fault simulated dataset is provided as the input to the CNN model.

12. The system of claim 10, wherein the CNN model comprises three 2-dimensional convolutional layers each connected with a max-pooling layer and a dropout layer, and two fully connected layers connected with the dropout layer.

13. The system of claim 10, wherein the one or more hardware processors are further configured to:

receive the name-plate dataset of each solar panel present in the solar panel network under test, the name-plate dataset of each solar panel present in the solar panel network under test comprises a number of PV cells ($N_S$) present in the corresponding solar panel, an open circuit voltage ($V_{OC\text{-}SRC}$), a short circuit current ($I_{SC\text{-}SRC}$), a maximum power point voltage ($V_{MP\text{-}SRC}$), and a maximum power point current ($I_{MP\text{-}SRC}$), at standard rating conditions; and receive the time-stamped operational log dataset of the solar panel network under test, the time-stamped operational log dataset comprises one or more of: a solar panel-wise current and a solar panel-wise voltage of each solar panel, a string-wise current and a string-wise voltage of each string, a sub-array-wise current and a sub-array-wise voltage of each sub-array, an array-wise current and an array-wise voltage of each array, a set of voltages of each inverter (DC and AC) of the one or more inverters, a power output of each inverter, a solar irradiation value (G), a cloudiness value (C), a rainfall value (r), a solar panel temperature of each solar panel, a temperature of each inverter, and a set of fault currents.

14. The system of claim 10, wherein the one or more hardware processors are further configured to determine the no-fault simulated dataset for each no-fault feature tensor (NFFT), based on the set of solar panel parameters for each solar panel and the one or more environmental parameters, wherein the no-fault simulated dataset for each no-fault feature tensor (NFFT) comprises:

a solar panel level no-fault simulated Current-Voltage-Power dataset ($SC_p$, $SV_p$, $SP_p$) of each solar panel;

a string level no-fault simulated Current-Voltage-Power dataset ($SC_s$, $SV_s$, $SP_s$) of each string;

a sub-array level no-fault simulated Current-Voltage-Power dataset ($SC_{sa}$, $SV_{sa}$, $SP_{sa}$) of each sub-array;

an array level no-fault simulated Current-Voltage-Power dataset ($SC_a$, $SV_a$, $SP_a$) of each array; and an inverter level no-fault simulated Current-Voltage-Power dataset ($SC_i$, $SV_i$, $SP_i$) of each inverter.

15. The system of claim 14, wherein the one or more hardware processors are further configured to determine:

the solar panel level no-fault simulated Current-Voltage-Power dataset ($SC_p$, $SV_p$, $SP_p$) of each solar panel, based on the set of parameters of the corresponding solar panel and the one or more environmental parameters;

the string level no-fault simulated Current-Voltage-Power dataset ($SC_s$, $SV_s$, $SP_s$) of each string, based on the solar panel level Current-Voltage-Power dataset ($SC_p$, $SV_p$, $SP_p$) of each solar panel present in the corresponding string;

the sub-array level no-fault simulated Current-Voltage-Power dataset ($SC_{sa}$, $SV_{sa}$, $SP_{sa}$) of each sub-array, based on the string level no-fault simulated Current-Voltage-Power dataset ($SC_s$, $SV_s$, $SP_s$) of each string present in the corresponding sub-array;

the array level no-fault simulated Current-Voltage-Power dataset ($SC_a$, $SV_a$, $SP_a$) of each array, based on the sub-array level no-fault simulated Current-Voltage-Power dataset ($SC_{sa}$, $SV_{sa}$, $SP_{sa}$) of each sub-array present in the corresponding array; and the inverter level no-fault simulated Current-Voltage-Power dataset ($SC_i$, $SV_i$, $SP_i$) of each inverter, based on the corresponding array level no-fault simulated Current-Voltage-Power dataset ($SC_a$, $SV_a$, $SP_a$) and the one or more environmental parameters.

16. The system of claim 10, wherein the one or more hardware processors are further configured to determine the fault simulated dataset for each fault feature tensor (FFT), based on the set of solar panel parameters for each solar panel and the one or more environmental parameters, wherein the fault simulated dataset for each fault feature tensor (FFT) comprises:

a solar panel level fault simulated Current-Voltage-Power dataset ($FC_p$, $FV_p$, $FP_p$) of each solar panel;

a string level fault simulated Current-Voltage-Power dataset ($FC_s$, $FV_s$, $FP_s$) of each string;

a sub-array level fault simulated Current-Voltage-Power dataset ($FC_{sa}$, $FV_{sa}$, $FP_{sa}$) of each sub-array;

an array level fault simulated Current-Voltage-Power dataset ($FC_a$, $FV_a$, $FP_a$) of each array; and an inverter level fault simulated Current-Voltage-Power dataset ($FC_i$, $FV_i$, $FP_i$) of each inverter.

17. The system of claim 16, wherein the one or more hardware processors are further configured to determine:

the solar panel level fault simulated Current-Voltage-Power dataset ($FC_p$, $FV_p$, $FP_p$) of each solar panel, based on the set of solar panel parameters of the corresponding solar panel and the one or more environmental parameters;

the string level fault simulated Current-Voltage-Power dataset ($FC_s$, $FV_s$, $FP_s$) of each string, based on the solar panel level fault simulated Current-Voltage-Power dataset ($FC_p$, $FV_p$, $FP_p$) of each solar panel present in the corresponding string;

the sub-array level fault simulated Current-Voltage-Power dataset ($FC_{sa}$, $FV_{sa}$, $FP_{sa}$) of each sub-array, based on the string level fault simulated Current-Voltage-Power dataset ($FC_s$, $FV_s$, $FP_s$) of each string present in the corresponding sub-array;

the array level fault simulated Current-Voltage-Power dataset ($FC_a$, $FV_a$, $FP_a$) of each array, based on the sub-array level fault simulated Current-Voltage-Power dataset ($FC_{sa}$, $FV_{sa}$, $FP_{sa}$) of each sub-array present in the corresponding array; and the inverter level fault simulated Current-Voltage-Power dataset ($FC_i$, $FV_i$, $FP_i$) of each inverter, based on the corresponding array level fault simulated Current-Voltage-Power dataset ($FC_a$, $FV_a$, $FP_a$) and the one or more environmental parameters.

18. The system of claim 10, wherein the one or more fault types are selected from a group comprising of: a short circuit fault, an open circuit fault, a shading fault, a soiling fault, a hot-spot fault, an arc fault, a degradation fault, and a clipping fault, the short circuit fault comprises a line-line fault, and a line-ground fault, and the one or more fault locations comprises one or more solar panel level fault locations, one or more string level fault locations, one or more sub-array level fault locations, one or more array level fault locations, one or more inverter level fault locations, one or more circuit elements level fault locations, and one or more line level fault locations.

19. A computer program product comprising a non-transitory computer readable medium having a computer readable program embodied therein, wherein the computer readable program, when executed on a computing device, causes the computing device to:

obtain a schema of the solar panel network under test, using a schema algorithm, the schema algorithm being able to capture information about a skeleton structure of the solar panel network under test, wherein the solar panel network under test comprises a plurality of solar panels and a plurality of circuit elements, the plurality of solar panels arranged in one or more strings, one or more sub-arrays and one or more arrays, along with one or more circuit elements of the plurality of circuit elements and one or more inverters;

determine a set of solar panel parameters for each solar panel present in the solar panel network under test, based on a name-plate dataset of each solar panel and a time-stamped operational log dataset of the solar panel network under test, wherein the set of solar panel parameters for each solar panel comprises a photo (light) current ($I_L$), a diode reverse saturation current ($I_O$), a series resistance ($R_S$), a shunt resistance ($R_{SH}$), and an ideality factor (n);

generate a network simulation model for the solar panel network under test, from the obtained schema and the set of solar panel parameters for each solar panel, using a modelling technique;

randomly generate a plurality of fault feature tensors (FFTs) and a plurality of no-fault feature tensors (NFFTs), for the generated network simulation model, wherein each fault feature tensor (FFT) of the plurality of fault feature tensors (FFTs) is associated with a fault scenario of a plurality of fault scenarios and each no-fault feature tensor (NFFT) of the plurality of no-fault feature tensors (NFFTs) is associated with a no-fault scenario of a plurality of no-fault scenarios, wherein each fault scenario is defined based on one or more fault types occurring at one or more fault locations in the solar panel network under test, and one or more environmental parameters comprising an operating temperature of an environment and a solar irradiance value of the environment, and each no-fault scenario is defined based on the one or more environmental parameters comprising the operating temperature of the environment and the solar irradiance value of the environment;

determine (i) a no-fault simulated dataset for each no-fault feature tensor (NFFT) of the plurality of no-fault feature tensors (NFFTs) by simulating the corresponding no-fault feature tensor (NFFT) using the generated network simulation model, and (ii) a fault simulated dataset for each fault feature tensor (FFT) of the plurality of fault feature tensors (FFTs) by simulating the corresponding fault feature tensor (FFT), using the generated network simulation model;

randomly divide the plurality of fault feature tensors (FFTs) and the plurality of no-fault feature tensors (NFFTs) into a training dataset and a testing dataset, wherein the training dataset comprises one or more training FFTs along with corresponding fault simulated datasets and one or more training NFFTs along with corresponding no-fault simulated datasets, and the testing dataset comprises one or more testing FFTs along with corresponding fault simulated datasets and one or more testing NFFTs along with corresponding no-fault simulated datasets; and generate a fault detection, diagnosis and localization (FDDL) model for fault detection, diagnosis and localization in the solar panel network; and training a convolutional neural network (CNN) model with the training dataset, wherein (i) each training FFT of the one or more training FFTs present in the training dataset, is provided as label and the corresponding fault simulated dataset is provided as an input to the CNN model, and (ii) each training NFFT of the one or more training NFFTs present in the training dataset, is provided as label and the corresponding no-fault simulated dataset is provided as the input to the CNN model.

* * * * *